United States Patent
Stewart et al.

(10) Patent No.: US 7,377,845 B2
(45) Date of Patent: May 27, 2008

(54) BUNDLING DEVICE

(75) Inventors: Anna M. Stewart, Atlanta, GA (US);
Stephen Kraigh Stewart, Atlanta, GA (US)

(73) Assignee: Fusionbrands Incorporated, Atlanta, GA (US)

( * ) Notice: Subject to any disclaimer, the term of this patent is extended or adjusted under 35 U.S.C. 154(b) by 0 days.

(21) Appl. No.: 11/530,744

(22) Filed: Sep. 11, 2006

(65) Prior Publication Data

US 2007/0254576 A1    Nov. 1, 2007

Related U.S. Application Data

(63) Continuation-in-part of application No. 29/255,629, filed on Mar. 11, 2006.

(51) Int. Cl.
*A22B 5/10* (2006.01)
(52) U.S. Cl. ....................................... 452/102
(58) Field of Classification Search ................ None
See application file for complete search history.

(56) References Cited

U.S. PATENT DOCUMENTS

| | | | |
|---|---|---|---|
| 330,087 A * | 11/1885 | Binns | 474/253 |
| 2,600,395 A * | 6/1952 | Domoj et al. | 87/13 |
| 2,842,443 A | 7/1958 | Rice et al. | |
| 3,112,515 A | 12/1963 | Volk | |
| 3,955,002 A | 5/1976 | Maxon et al. | |
| 4,293,977 A | 10/1981 | Volk et al. | |
| 4,962,929 A * | 10/1990 | Melton, Jr. | 473/516 |
| 5,181,880 A | 1/1993 | Volk | |
| 5,279,519 A | 1/1994 | Volk | |
| 5,380,241 A | 1/1995 | Volk | |
| 5,699,657 A * | 12/1997 | Paulson | 57/22 |
| 5,816,905 A | 10/1998 | Marchese | |
| 5,970,697 A * | 10/1999 | Jacobs et al. | 57/22 |
| 6,016,744 A | 1/2000 | Pritsker | |

* cited by examiner

*Primary Examiner*—Thomas Price
(74) *Attorney, Agent, or Firm*—George Ronald Reardon

(57) ABSTRACT

A poultry lacer device is disclosed for sewing closed a fowl such as a chicken or turkey in preparation for cooking. The poultry lacer device is comprised of a textured cord having an array of alternating cord protrusions and cord indentions with a sewing implement operable for penetrating the skin of a fowl affixed to one end of the textured cord and a gripping assembly connected to the other end of the textured cord that is operable for cinching and un-cinching of the textured cord around the carcass of a fowl.

6 Claims, 4 Drawing Sheets

BUNDLING DEVICE

This application claims the benefit of the filing date of and is a continuation-in-part of United States Design patent application having a title of BUNDLING DEVICE, filed on Mar. 11, 2006 and assigned Ser. No. 29/255,629.

FIELD OF THE INVENTION

The present invention relates to the field of cooking accessories, and more particularly to devices for preparing a whole fowl for cooking.

BACKGROUND OF THE INVENTION

Since ancient times, cooking certain items has presented challenges. Items that tend to break apart during the cooking process present one of those challenges, such as poultry that is baked in the oven. One solution for poultry pertains to using a truss.

To truss means to secure poultry into a compact shape. To truss poultry with string, a user generally uses the following procedure

- take a piece of butcher's string about three times the length of the bird
- place the bird on its back, with the tail end nearest to the user
- slide the string underneath so that it is cradling the bird in the center of its back
- gently pull the string up the sides, then around the wings of the bird
- pull the strings towards the user, close to the breast of the bird, so that the wings are held against the body of the bird
- cross the strings at the base of the breast of the bird
- wrap each string around the end of a drumstick
- tie the ends of the string together, cinching it tightly so that the legs cross
- lift the bird so that the tail end is up and wrap the string around the tail
- tie the string, pulling tightly so that the cavity is covered by the tail
- place the bird on its back again
- bring the string back to the front
- tie the string off
- the bird is now ready for the oven As can be seen by the above procedure, this is a complicated and time-consuming process.

One way that others have tried to solve this problem is by creating a series of straight skewer style metal pins that are placed from one side of the cavity through the skin of the fowl bridging across to the other side of the cavity and through the skin on that side. This is done multiple times with multiple skewers in parallel fashion to each other all the way down the cavity opening. Then, a string is woven back and forth around the back side of the pin and crisscrossing over the cavity to the other side of the same pin and down to the next and so on and so on until the entire cavity has been done in this way. As the user weaves the string the user pulls tight the cavity. The user ties off the string at the end and is finished. Once the fowl is cooked, the user removes the apparatus by cutting the string and locating all the pins and pulling them out one by one.

A second way others have tried to solve this problem is to use a large needle and string to sew the cavity closed.

A third way that has been tried is to create a length of spiraled stainless steel wire that is used like a screw. The user pokes through the skin using the point on the spiral device and weaves back and forth to capture both sides of the skin and twist the skin closed.

Known art related to a poultry lacer device includes the following.

U.S. Pat. No. 2,842,443, issued to Rice et al. on Jul. 8, 1958, discloses a poultry product in which the fowl can be compressed into a shape amenable to uniform packaging.

U.S. Pat. No. 3,112,515, issued to Volk on Dec. 3, 1963, discloses a retainer or yoke which engages the folded legs of dressed poultry in such a manner that they are prevented from separating from each other and from moving away from the body of the fowl and eliminates the necessity of having to sew up the bird after stuffing the same.

U.S. Pat. No. 3,955,002, issued to Maxon et al. on May 4, 1976, discloses a method of trussing a poultry carcass including folding the neck skin over the back of the carcass, placing the central part of a cord over the neck skin and passing the end portions of the cord over the wings, about the body, under the keel and back on the other side of the body, tieing the cord over the neck skin. A modified trussing method includes making a slit in the skin of the body of the carcass, tucking the end of the humerus section of the wing into this slot and, if desired, binding the wing section in position by placing a cord over the wing section, suitably over the body skin covering the end of this section.

U.S. Pat. No. 4,293,977, issued to Volk et al. on Oct. 12, 1981, discloses a poultry leg retainer formed of a single elongated piece of material that is limitedly resiliently deformable, has a central U-shaped portion adapted to fit in the creases of poultry hocks with extensions to substantially right angle bends with outwardly extending shoulders curving through substantially 90° in a plane inclined to the central portion and to the extensions with hooked legs depending from the shoulders to more positively grip and secure poultry legs to the carcass while admitting of bagging trussed fowl without puncture.

U.S. Pat. No. 5,181,880, issued to Volk on Jan. 26, 1993, discloses a method and apparatus for trussing a turkey carcass is provided wherein the skin of the carcass is slit on either side of the evisceration cavity, exposed hocks are pushed through each of the slits, the hocks are pulled toward each other until they are adjacent and a cap is applied over the hocks to hold them together. In this fashion, a portion of the skin of the carcass is used to hold and anchor the hocks downwardly against the carcass.

U.S. Pat. No. 5,380,241, issued to Volk on Jan. 10, 1995, discloses a poultry hock truss for use with a body of eviscerated poultry having hocks and comprising a unitary substantially coplanar thin plastic member. The plastic member includes an anchor element adapted for attachment to the body of eviscerated poultry. A pair of side portions extends upwardly and outwardly from the anchor element and terminate in inwardly curved upper ends. An upper transverse crosspiece joins the inwardly curved upper ends of the side portions and a tab portion depends approximately from the midpoint of the upper transverse crosspiece toward the anchor element. The upper transverse crosspiece, the tab portion, the side portions and the anchor element define a generally heart-shaped opening with first and second juxtaposed lobes. The lobes of the heart-shaped opening are formed to hold the hocks together in juxtaposition.

U.S. Pat. No. 5,279,519, issued to Volk on Jan. 18, 1994, discloses a flat, relatively rigid truss is disclosed which is useful for retaining hocks of dressed chicken hocks, which are more flexible than dressed turkey hocks, for example. A lower crosspiece has outward extending hooks which lock into the kidney cavity of the carcass. Outward upward slanted sides are connected by curves to a top traverse crosspiece. The upper and lower edges of the top crosspiece diverge at the center to form an opening for attachment of tags for weight, price, inspection data, cooking instructions and the like. The lower and upper crosspieces and sides define an enlarged opening to receive the hocks and tail of the chicken. The hocks fit into the insides of the curves at the intersections on the sides and top cross piece.

U.S. Pat. No. 5,816,905, issued to Marchese on Oct. 6, 1998, discloses a kit for identifying a cooking process applied to poultry includes color coded elastic loops having a polyester and cotton fabric sleeve which is color coded and correlated with the process applied to the poultry.

U.S. Pat. No. 6,016,744, issued to Pritsker on Jan. 25, 2000, discloses a poultry retainer for retaining poultry has a strap for closing the rear opening of the poultry and a piercing member for piercing the skin and holding the skin over the front opening to close the front opening. The poultry retainer also includes a base having first and second pieces which are slidably connected together to provide an adjustable distance between the strap and piercing member for accommodating varying size poultry. Wing holders and a leg clip draw the wings and legs toward the body of the poultry to reduce drying of the wings and legs during cooking.

U.S. Published Patent Application No. 2005/0241116 A1, inventors Stewart et al. published on Nov. 3, 2005, discloses an adjustable bundling device is that aids in the cinching and un-cinching of one or more items, such as the wrapping of food items in preparation for cooking. A cavity element and a stop element are attached to opposing ends of a length of flexible textured cord. The cord can be pushed through the cavity to form a loop that can hold various items. The loop can be tightened and loosened by sliding the cord within the cavity. The texture of the cord interacts with protrusions in the cavity to lock the cord in place. The cavity acts a type of clench and the end stop prevents the cord from slipping all the way out of the cavity.

While these devices fulfill their respective, particular objectives and requirements, the aforementioned patents do not utilize or disclose a poultry lacer having a textured cinching cord with a corresponding gripper for tightening that cord on one end and a sharp needle element on the other end.

Therefore, a need exists for a poultry lacer device with these attributes and functionalities. The poultry lacer device according to embodiments of the invention substantially departs from the conventional concepts and designs of the prior art. It can be appreciated that there exists a continuing need for a new and improved poultry lacer device which can be used commercially. In this regard, the present invention substantially fulfills these objectives.

The foregoing patent and other information reflect the state of the art of which the inventors are aware and are tendered with a view toward discharging the inventors' acknowledged duty of candor in disclosing information that may be pertinent to the patentability of the present invention. It is respectfully stipulated, however, that the foregoing patent and other information do not teach or render obvious, singly or when considered in combination, the inventors' claimed invention.

BRIEF SUMMARY OF THE INVENTION

The general purpose of the present invention, which will be described subsequently in greater detail, is to provide a device that trusses a fowl in preparation for cooking. Generally speaking, the present invention facilitates the holding together of a whole fowl, e.g. a chicken, a turkey, in preparation for cooking. In an exemplary embodiment the present invention is comprised of a textured cord having alternating cylinder-like protrusions and recessions in a peak and valley configuration. The present invention is further comprised of a gripping cavity assembly connected to one end that is formed and dimensioned for insertion and holding of the textured cord. The present invention is further comprised of a sharp pointed element affixed on the other end of the textured cord that serves as a sewing implement. The sharp pointed element is preferably made from stainless steel. In an exemplary embodiment of the present invention, especially to be used in a high-heat environment such as cooking, the cord is made of a high temperature resistant silicone material.

The present invention mimics the traditional needle and string method of lacing up the cavity of a bird for the purposes of holding in stuffing while cooking. The poultry lacer combines the holding features of a textured cord with a corresponding cavity assembly that grips and holds the textured cord with that of a sewing needle type of structure. The needle element is affixed to the opposite end from the cavity assembly.

This one piece design with a needle, cord and cavity assembly facilitates the quick and easy procedure of sewing closed of a fowl and tightening using the holding features of the textured cord and corresponding cavity assembly. Once the fowl has been cooked the poultry lacer device can either be pulled back out of the bird or pulled through by cutting the soft skin of the cooked fowl.

The present invention departs from the prior art in several features. All materials are high heat resistant, e.g. stainless steel for the needle element and silicone for the cord and cavity assembly. The materials of the present invention make it dishwasher safe and reusable.

This present invention is different from what others have done in that it combines the usefulness of a needle and thread method of sewing with out the need to thread the needle. None of the devices in the prior art cited have the added feature described as the following; once the cavity has been tightly closed the textured cord can be snapped into the cavity assembly and the structure cinched by pulling the cord tightly. This process completely closes off the gaps in the skin closure that other methods do not.

One piece design ensures that no parts of the device get lost. The present invention is more sanitary than a string alternative, is reusable and is dishwasher safe. The flexibility of the silicone portion makes it easier and faster to use than any of the other devices.

One aspect of the present invention is that it may be used to sew up a fowl for cooking.

Another aspect of the present invention is that it may be used in most cooking temperatures.

Another aspect of the present invention is that it may be reused.

Another aspect of the present invention is that is dishwasher safe.

Another aspect of the present invention is that is may be manufactured economically.

Another aspect of the present invention is that it may be made from readily available materials.

These and other features and advantages of the present invention will be presented in more detail in the following specification of the invention and the accompanying figures, which illustrate by way of example the principles of the invention.

There are additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE SEVERAL VIEWS OF THE DRAWINGS

The invention, together with further advantages thereof, may best be understood by reference to the following description taken in conjunction with the accompanying drawings in which.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known operations have not been described in detail so not to unnecessarily obscure the present invention.

Figure 1:
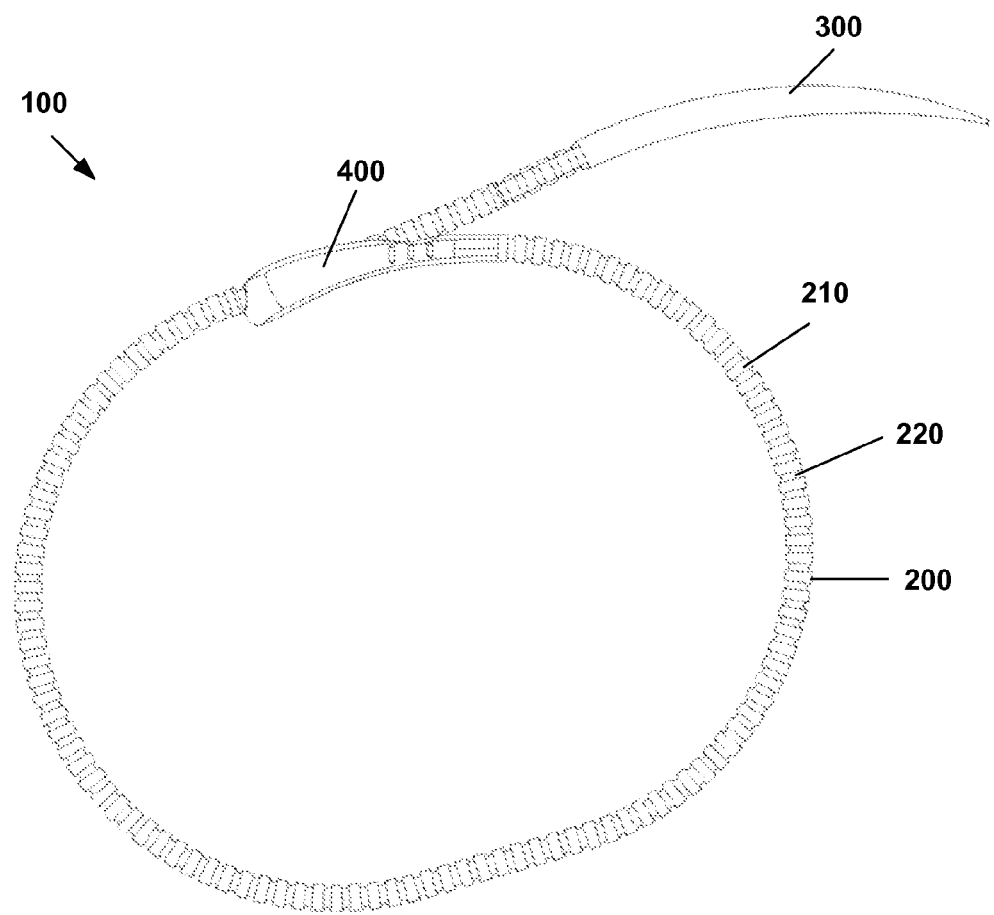
FIG. 1 illustrates a side plan view of a poultry lacer device in the closed position, according to an embodiment of the present invention.
Figure 2:
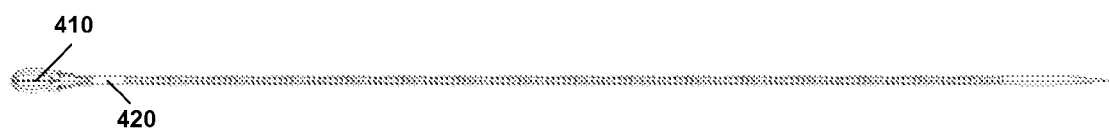
FIG. 2 illustrates a top plan view of a poultry lacer device in the open position, according to an embodiment of the present invention.
Figure 3:
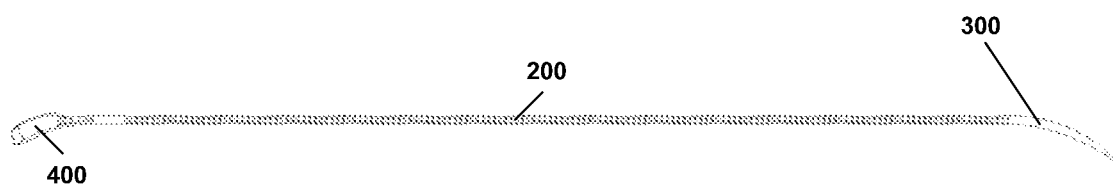
FIG. 3 illustrates a side perspective view of a poultry lacer device in the open position, according to an embodiment of the present invention.
Figure 4:
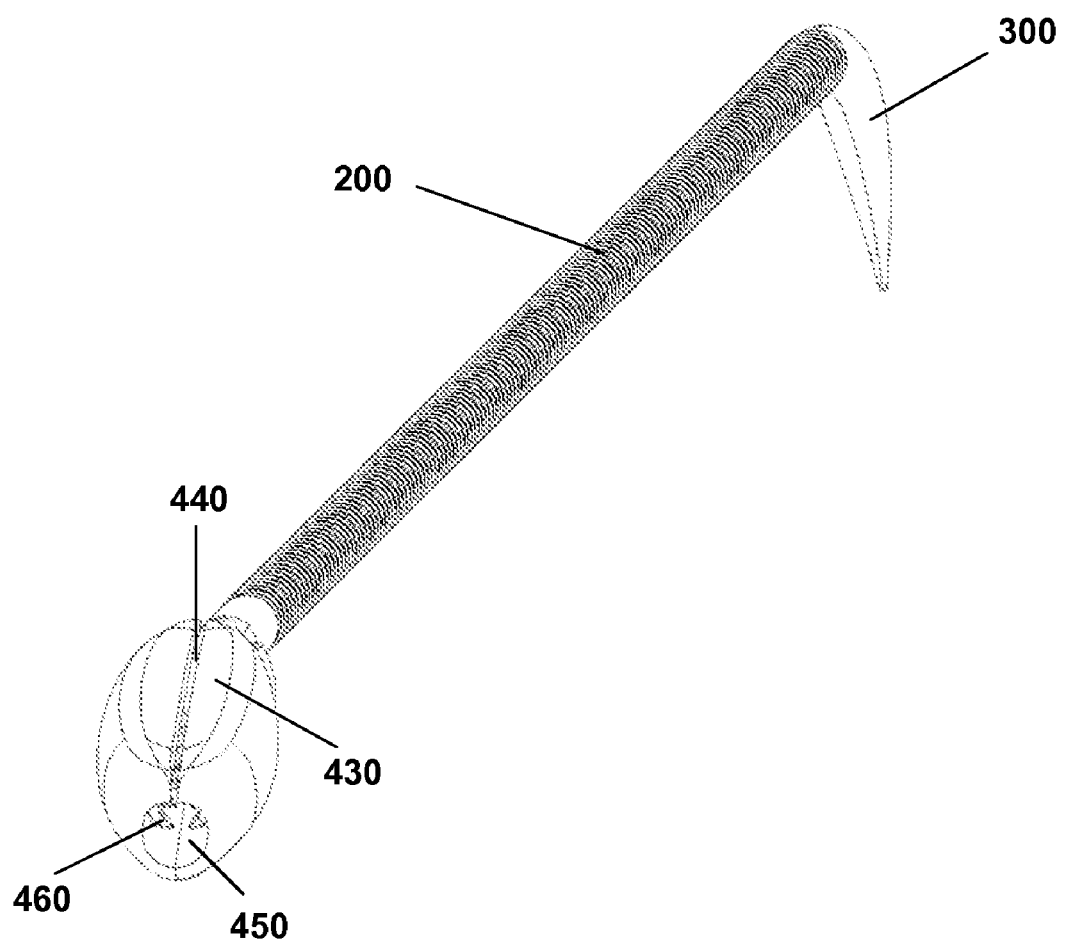
FIG. 4 illustrates a front perspective view of a poultry lacer device in the open position, according to an embodiment of the present invention.

Referring now to FIG. 1 through FIG. 4 an embodiment of a poultry lacer device 100 is comprised of a textured cord 200 connected on the front end to a needle element 300 and connected on the terminating end to a cavity end assembly 400. In the illustrated embodiment the textured cord 200 is further comprised of a series of alternating cord protrusions 210 and cord indentions 220 that are substantially equally spaced along textured cord 200. It will be appreciated that the illustrated structure, although in and of itself may be considered novel, is not the only such embodiment that can be employed in various embodiments of the present invention.

Cavity end assembly 400 is further comprised of a cavity end connector 420 and a cavity end holder 410. Cavity end holder 410 is further comprised of a finger depression 430, a cavity outside opening 440, a cavity inside opening 450 and cavity cord stoppers 460. Cavity end connector 420 is connected to the terminating end of textured cord 200 by the terminating end of textured cord 200 being inserted and fused to the cavity end connector. Needle portion 300 is connected to the front end of textured cord 200 by inserting the near end of needle element 300 into the front end of textured cord 200.

In one embodiment a poultry lacer device is comprised of a textured cord having a first end and a second end, a cavity end assembly connected to the first end, a needle element affixed to the second end where the textured cord is comprised of a plurality of a cord protrusions and cord indentions arranged in a substantially equally spaced alternating array with the cavity end assembly being comprised of a cavity end connector affixed to a cavity end holder, with the cavity end holder being comprised of a finger depression, a cavity outside opening formed substantially centrally within the finger depression, a cavity inside opening disposed underneath the finger depression and a plurality of cavity cord stopper disposed within the cavity inside opening.

In another embodiment, the poultry lacer device comprises a structure for closing the cavity of a fowl for cooking, where the structure includes a rigid or semi-rigid threading fixture for closing is comprised of a securing structure for holding the lace, or for cinching. The cinching structure may be comprised of a cavity assembly connected to a first end of a textured cord having an array of alternating cord protrusions and cord indentions and the means for sewing may be comprised of a needle element connected to a second end of the textured cord.

Although the cavity has been described and illustrated as a to-loading, single cavity, it will be appreciated that other embodiments of the cavity are also anticipated. For instance, the cavity may be constructed in a manner to allow for side loading of the textured cord. In this embodiment the textured cord can either be depressed into the cavity by a finger or other device, or can be pulled sidewise and forced into the cavity. In addition, the cavity may include a wrap-around structure. In this embodiment, the cavity would be positioned on one side of the cavity housing, extend across the end of the housing and maybe even onto the other side of the housing. In this embodiment, the textured cord can be simply wrapped around the cavity housing. Advantageously, this structure provides more gripping strength. In addition, it will be appreciated that the cavity housing may include more than one cavity. In such an embodiment the textured cord can be looped around and fed through multiple cavities, thereby increasing the holding strength of the cavity. Likewise the textured cord can be wrapped around an object multiple times with the textured cord being inserted into a cavity on each wrap. In addition, it will be appreciated that multiple cavities running in different directions may be employed in the cavity housing. Using this embodiment, the textured cord can pass through a cavity in one direction, and then loop around an object in a different plane, such as perpendicular to the first wrap, and then be fed into to perpendicular cavity.

From the foregoing, it will be appreciated that, although specific embodiments of the invention have been described herein for purposes of illustration, various modifications may be made without deviating from the spirit and scope of the invention. For example, many of the features and components described above in the context of a particular poultry lacer device configuration can be incorporated into other configurations in accordance with other embodiments of the invention. Accordingly, the invention is not limited except by the appended claims.

What is claimed is:

1. A high temperature resistant dishwasher safe poultry lacer device comprised of:
    a textured cord having a first end and a second end,
    a cavity end assembly connected to the first end, and
    a needle element affixed to the second end, wherein the textured cord is made of silicone.

2. The poultry lacer device of claim 1, wherein the textured cord is comprised of a plurality of a cord protrusion and a cord indention arranged in a substantially equally spaced alternating array, wherein the needle element is made of stainless steel.

3. The poultry lacer device of claim 2, wherein the cavity end assembly is comprised of a cavity end connector affixed to a cavity end holder, wherein each cord protrusion is a cylinder-like cord protrusion and each cord indention is a cylinder-like cord indention.

4. The poultry lacer device of claim 3, wherein the cavity end holder is comprised of a finger depression, a cavity outside opening formed substantially centrally within the finger depression, a cavity inside opening disposed underneath the finger depression and a plurality of a cavity cord stopper disposed within the cavity inside opening.

5. A high temperature resistant dishwasher safe lacer device comprised of a textured cord having a first end an a second end and including a plurality of a cord protrusion and a plurality of a cord indention arranged in an alternating array, a cavity end assembly connected to the first end, and a needle element affixed to the second end, wherein the textured cord is made of high temperature resistant silicone, each cord protrusion is cylinder-like, and each cord indention is cylinder-like.

6. The poultry lacer device of claim 5, wherein the needle element is curved and made of stainless steel.

* * * * *